A. BENSON.
LOOSE LEAF BINDER.
APPLICATION FILED DEC. 7, 1908.
949,143.
Patented Feb. 15, 1910.
2 SHEETS—SHEET 1.
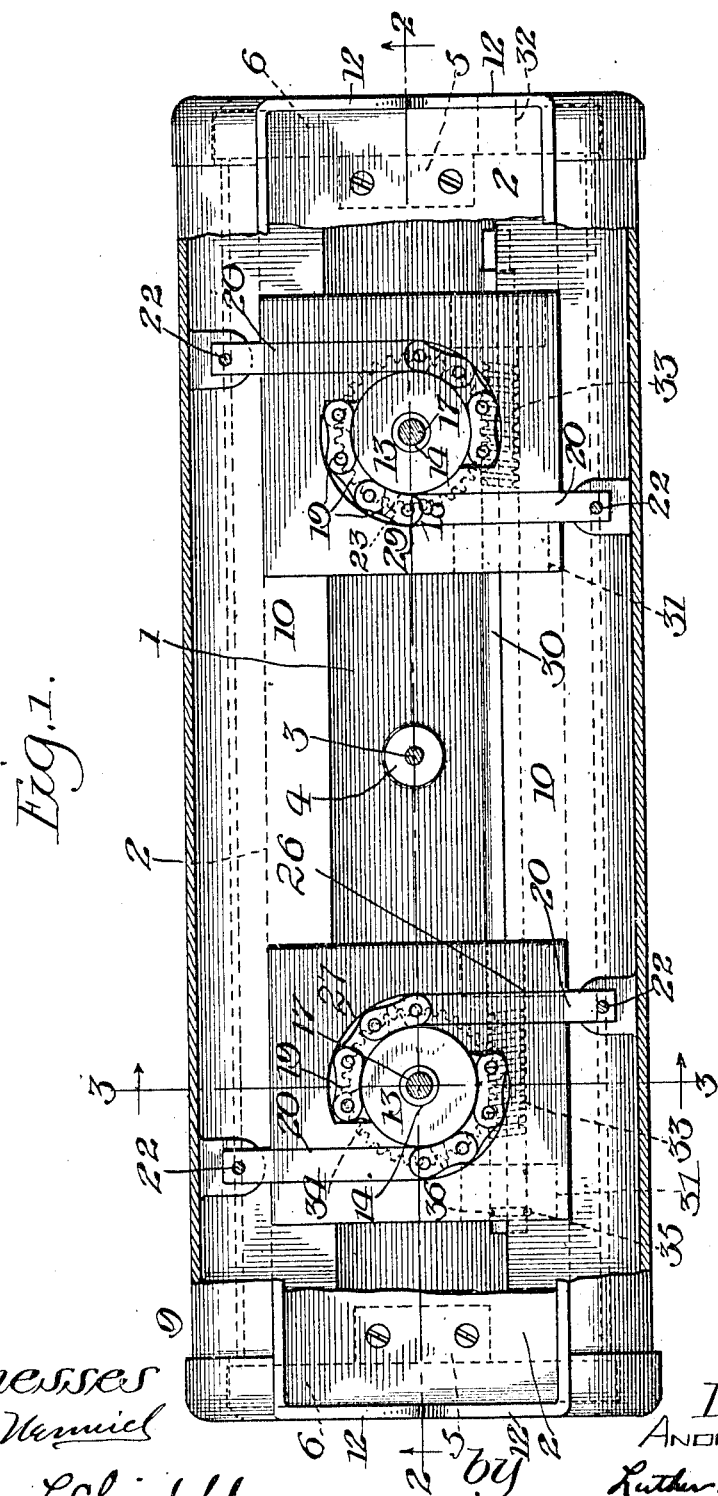
Witnesses
O. W. Hammiel
George L Chindahl
Inventor
ANDREW BENSON
Luther L Miller
Atty A. BENSON.
LOOSE LEAF BINDER.
APPLICATION FILED DEC. 7, 1908.
949,143.
Patented Feb. 15, 1910.
2 SHEETS—SHEET 2.
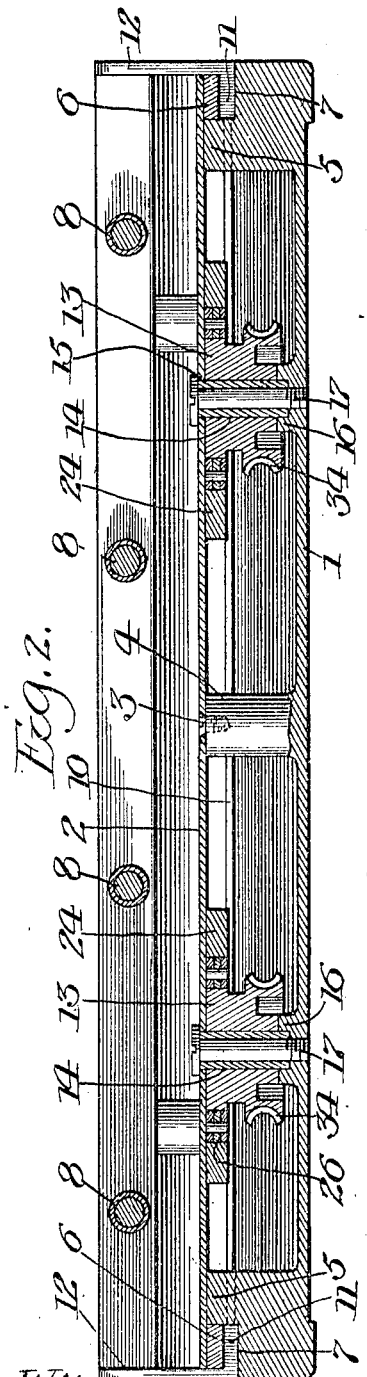
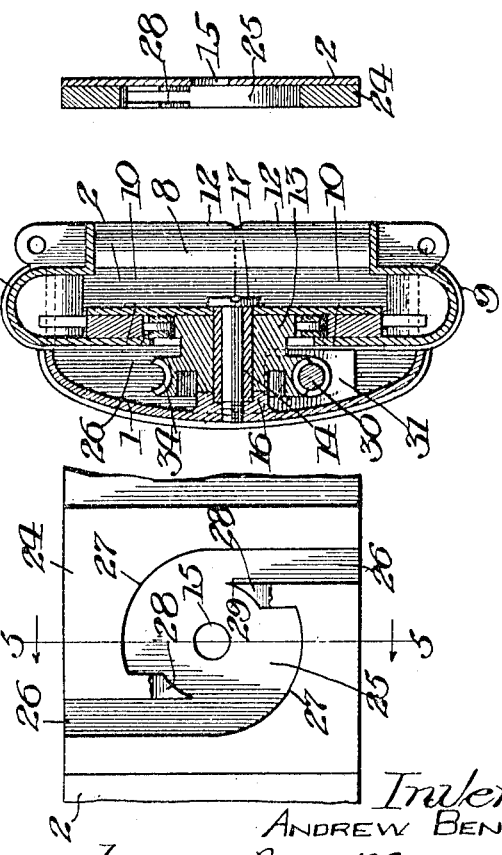
Witnesses:
Inventor
ANDREW BENSON
by
Atty.

UNITED STATES PATENT OFFICE.

ANDREW BENSON, OF CHICAGO, ILLINOIS, ASSIGNOR TO FORT DEARBORN MANUFACTURING COMPANY, OF CHICAGO, ILLINOIS, A CORPORATION OF ILLINOIS.

LOOSE-LEAF BINDER.

949,143.  Specification of Letters Patent.  Patented Feb. 15, 1910.

Application filed December 7, 1908. Serial No. 466,244.

*To all whom it may concern:*

Be it known that I, ANDREW BENSON, a citizen of the United States, residing at Chicago, in the county of Cook and State of Illinois, have invented certain new and useful Improvements in Loose-Leaf Binders, of which the following is a specification.

One of the objects of this invention is to provide a strong, simple, durable, and reliable mechanism for expanding and contracting the clamping members of a loose-leaf ledger or other binder.

The invention also relates to the other features of improvements in loose-leaf binders hereinafter set forth.

In the accompanying drawings Figure 1 is a top plan view of a binder or ledger back embodying the features of my invention, portions being sectioned away. Fig. 2 is a sectional view upon line 2 2 of Fig. 1. Fig. 3 is a section on line 3 3 of Fig. 1. Fig. 4 is a fragmental underside view of the recessed member in which certain of the movable parts are located. Fig. 5 is a section on line 5 5 of Fig. 4. Fig. 6 is a detail view of one of the rollers or sprockets, together with its driving worm wheel. Fig. 7 is a detail view of a modification.

The embodiment selected for illustration comprises a concave back piece 1, to the upper side of which is secured a plate 2 by means of screws 3 extending through said plate into bosses 4 and 5 at the middle and near the ends of said back piece. Transverse guide bars 6 are secured in any suitable manner to the ends of the plate 2, the length of said bars being substantially equal to the width of the back piece 1. Upon the ends of said back piece, beneath the guide bars 6 are formed guideways 7.

The leaf-engaging posts 8 are carried by two side members 9. Each of said side members comprises a flange or section 10, the ends of which are provided with guide portions 11 slidably mounted upon the ways 7 and between said ways and the guide bars 6.

12 are end flanges upon the side members 9.

The means herein shown for moving the side members 9 toward and away from each other comprises two rotatable members carried by the back piece 1 and flexible connections between said rotatable members and said side members. Said flexible connections are adapted to be wound to a greater or less extent around said rotatable members for the purpose of drawing the side members 9 together, and said flexible connections are adapted to push the side members 9 away from each other when the rotatable members are rotated in the direction to unwind said flexible connections.

Referring to Figs. 1 and 6: 13 are rollers or sprocket wheels rotatably mounted upon bushings 14, said bushings extending through openings 15 in the plate 2 and being seated in recesses formed in bosses 16 upon the inner side of the back piece 1. Cap screws 17 extend through said sleeves and engage the bosses 16.

The flexible connections 18 hereinbefore referred to may consist of chains, steel tapes or steel cables, and in the form herein illustrated each connection comprises three links 19 and a rod 20. One end of the flexible connection is pivotally secured to a lug 21 (Fig. 6) upon the periphery of the roller 13 and the other end is attached at 22 (Fig. 1) to the adjacent side member 9. Each roller 13 has attached thereto at diametrically opposite points two of the flexible connections just described, said connections extending to opposite side members 9. It will therefore be seen that each of said side members is connected at two points with the rollers 13. If desired, the rollers 13 may be provided with sprocket teeth 23 to engage the links 19 and assist in positively moving the latter.

The flexible connections joining the side members 9 to the rollers 13 may be prevented from buckling by being mounted in suitable guideways. As herein shown, two blocks 24 are fixed in any suitable manner to the under side of the plate 2, each being provided with a recess or opening 25 to accommodate a roller 13 and two connections 18, guideways 26 communicating with the recess 25 being formed in said blocks. The recess 25 has curved walls 27 which confine the links 19 against displacement. Projections 28 extending close to the periphery of the roller 13 prevent the links of the chain from buckling and following the periphery of the roller as said chains are unwound or forced outwardly. In case the rollers 13 are provided with teeth 23, the projections 28 will be slotted, as indicated in Figs. 4 and 5. The engagement of the lugs 21 with the ends 29 of the projections 28 limits the opening or separating movement of the side members 9.

The means herein shown for rotating the rollers 13 to move the side members 9 in and out, comprises a shaft 30 extending longitudinally of the back piece 1 and mounted in bearing bosses 31 upon said back piece. One end of the shaft 30 is squared for engagement by a suitable key (not shown), an opening 32 for said key being provided in the adjacent end of one of the side members 9. The shaft 30 has formed thereon two worms 33 engaging worm wheels 34 which may be formed integral with the rollers 13. The spiral threads of the worms 33 are oppositely inclined, whereby the rollers 13 are rotated in opposite directions. The oppositely-acting worms 33 prevent longitudinal movement of the shaft 30 in its bearings, but, if desired, special means for preventing endwise movement of the shaft may be provided, as, for example, a pin 35 in one of the bearings 31, engaging in an annular groove 36 formed in said shaft.

The links of the flexible connections 18 may be of the form shown in Fig. 7, in order to obviate the necessity for the guide walls 27 and the projections 28. The links 19ᵃ have shoulders 37 thereon, which prevent the flexible connection from bending in one direction out of a straight line, and shoulders 38 which limit flexing movement in the opposite direction beyond what is needed to enable the links to lie in contact with the periphery of the sprocket wheel.

In use, assuming the binder to be expanded, the leaves are placed upon the posts 8 and the side members 9 moved toward each other to clamp the leaves between them. The side members 9 are thus moved by rotating the shaft 30 in the appropriate direction, the rollers 13 being rotated to pull the flexible connections 18 inwardly. When leaves are to be withdrawn or inserted the binder is expanded by rotating the shaft 30 in the opposite direction, whereupon the rollers 13 push the flexible connections 18 outwardly and force the side members 9 apart, the guideways 26 and the guide walls 27 preventing said connections from buckling. When the side members 9 are moved in and out the guide portions 11 thereof slide in the guideways formed between the parts 6 and 7.

I would have it understood that I desire not to be limited to the details of construction herein shown and described, for various modifications will occur to persons skilled in the art.

I claim as my invention:

1. In a loose-leaf binder, in combination, a central member; two side members; and means for moving said side members comprising a rotatable winding element mounted on said central member, flexible connections between said side members and said winding member arranged to be wound on said winding member, and guide means for said flexible connections.

2. In a loose-leaf binder, in combination, a central member; two side members; and means for moving said side members comprising a roller mounted on said central member, a plurality of flexible connections attached to said roller and said side members arranged to be wound on said roller, and guide means for said flexible connections.

3. In a loose-leaf binder, in combination, two side members; a relatively stationary portion having two oppositely extending guideways therein; a roller; means for rotating said roller; and flexible connections between said roller and said side members, said flexible connections being arranged to move in said guideways.

4. In a loose-leaf binder, in combination, two side members; a relatively stationary portion having a recess therein and two oppositely extending guideways communicating with said recess; a roller within said recess; and flexible connections between said roller and said side members, said flexible connections being arranged to move in said recess and said guideways.

5. In a loose-leaf binder, in combination, a back piece; a plate extending longitudinally of said back piece and attached thereto; two side members slidable with relation to said back piece; and means for moving said side members comprising a roller, a pivot for said roller extending between said back piece and said plate, means upon the under side of said plate providing a recess for said roller and oppositely extending guideways communicating with said recess, and flexible connections attached to said roller and said side members adapted to move in said guideways.

6. In a loose-leaf binder, in combination, a central member; two side members; and means for moving said side members comprising a roller mounted on said central member, a flexible connection between each of said side members and said roller, each of said connections comprising a plurality of links and a rod, one of said links being attached to said roller and one end of said rod being attached to said side member, and guide-means for said flexible connections.

7. In a loose-leaf binder, in combination, a central member; two side members; and means for moving said side members comprising a roller mounted on said central member, a flexible connection between each of said side members and said roller, each of said connections comprising a plurality of links and a rod, one of said links being attached to said roller and one end of said rod being attached to said side member, said links having shoulders thereon to limit their flexing movement in one direction out of a straight line, and guide-means for said flexible connections.

8. In a loose-leaf binder, in combination, a central member; two side members; and means for moving said side members comprising a roller mounted on said central member, a flexible connection between each of said side members and said roller, each of said connections comprising a plurality of links and a rod, one of said links being attached to said roller and one end of said rod being attached to said side member, said links having shoulders thereon to limit their flexing movement in one direction beyond what is necessary to permit said links to lie in contact with the periphery of said roller, and guide-means for said flexible connections.

9. In a loose-leaf binder, in combination, a back piece having guideways upon its ends; a plate extending longitudinally of said back piece and secured thereto; a transverse guide member on each end of said plate, the length of said guide member being substantially equal to the width of said back piece; two side members having guide portions slidably mounted between said guideways and guide members; and means for moving said side members toward and away from each other.

10. In a loose-leaf binder, in combination, a back piece; a plate extending longitudinally of said back piece and secured thereto; two side members slidable with relation to said back piece; and means for moving said side members comprising a roller, a sleeve upon which said roller is rotatably mounted, one end of said sleeve lying in an opening in said plate and the other end in a recess in said back piece, a screw extending through said sleeve into said back piece and securing said sleeve to said back piece, a block upon the under side of said plate, said block having an opening therein in which said roller is mounted, said block having two oppositely extending guideways therein communicating with said opening, and flexible connections attached to said roller and said side members and movable within said opening and said guideways.

ANDREW BENSON.

Witnesses:
C. PAUL PARKER,
GEORGE L. CHINDAHL.